(12) United States Patent
Paluszek et al.

(10) Patent No.: US 8,081,302 B2
(45) Date of Patent: Dec. 20, 2011

(54) MULTIMODE OPTICAL SENSOR

(75) Inventors: Michael P. Paluszek, Princeton, NJ (US); Pradeep Bhatta, Plainsboro, NJ (US)

(73) Assignee: Princeton Satellite Systems, Inc., Plainsboro, NJ (US)

( * ) Notice: Subject to any disclaimer, the term of this patent is extended or adjusted under 35 U.S.C. 154(b) by 612 days.

(21) Appl. No.: 12/193,180

(22) Filed: Aug. 18, 2008

(65) Prior Publication Data

US 2010/0328645 A1   Dec. 30, 2010

Related U.S. Application Data

(60) Provisional application No. 60/956,417, filed on Aug. 17, 2007.

(51) Int. Cl.
*G01C 3/10* (2006.01)
*G01J 5/08* (2006.01)

(52) U.S. Cl. ....... 356/9; 356/4.01; 356/5.01; 356/141.1; 250/353; 250/338.1

(58) Field of Classification Search ............. 356/9, 4.01, 356/5.01, 141.1, 28.5; 250/201.9, 216, 493.1, 250/353, 336.1, 338.1, 338.5, 458.1; 398/128; 359/859, 225, 226, 519

See application file for complete search history.

(56) References Cited

U.S. PATENT DOCUMENTS

| | | | | |
|---|---|---|---|---|
| 4,515,472 A * | 5/1985 | Welch | ........................... | 356/5.09 |
| 4,995,720 A * | 2/1991 | Amzajerdian | ............... | 356/5.06 |
| 5,135,183 A * | 8/1992 | Whitney | ..................... | 244/3.16 |
| 5,159,396 A * | 10/1992 | Yuhas | .......................... | 356/28.5 |
| 5,808,472 A * | 9/1998 | Hayes | ........................... | 324/671 |
| 6,411,871 B1 * | 6/2002 | Lin | ................................. | 701/27 |
| 6,677,941 B2 * | 1/2004 | Lin | ............................... | 345/419 |
| 6,849,841 B2 * | 2/2005 | Byren et al. | ................. | 250/201.9 |
| 7,049,597 B2 * | 5/2006 | Bodkin | ........................ | 250/353 |
| 7,215,430 B2 * | 5/2007 | Kacyra et al. | ................. | 356/601 |
| 7,505,145 B2 * | 3/2009 | Hays et al. | ..................... | 356/519 |
| 7,556,389 B2 * | 7/2009 | Cook | ............................ | 359/859 |
| 7,656,526 B1 * | 2/2010 | Spuler et al. | ................. | 356/336 |

* cited by examiner

*Primary Examiner* — Sang Nguyen
(74) *Attorney, Agent, or Firm* — Fox Rothschild LLP; Richard C. Woodbridge; Perry M. Fonseca

(57) ABSTRACT

A Multimode Optical Sensor (MMOS) is a laser radar (ladar) that employs both coherent, or heterodyne, and noncoherent detection at long range, i.e. ranges for which the target is no more than a pixel in dimension. Coherent detection provides much higher velocity resolution while the noncoherent detection can provide better detectability.

8 Claims, 1 Drawing Sheet

MULTIMODE OPTICAL SENSOR

CROSS REFERENCE TO RELATED APPLICATIONS

This application is related to, and claims priority from U.S. provisional application No. 60/956,417 filed on Aug. 17, 2007 by M. Paluszek entitled "Multimode Optical Sensor", the contents of which are hereby incorporated by reference.

STATEMENT REGARDING FEDERALLY SPONSORED RESEARCH OR DEVELOPMENT

This invention was made with Government support under Contract No. F29601-02-C-0029 awarded by the U.S. Air Force. The Government has certain rights in the invention.

FIELD OF THE INVENTION

The present invention relates to detection of spacecraft using optical sensors.

BACKGROUND OF THE INVENTION

Many ladar and optical sensors have been developed for use by spacecraft for rendezvous and docking missions. Some of these are discussed briefly below.

Sandia National Labs has, for instance, developed a scannerless rangefinder that can produce high density depth maps at high rates. The range imager apparently works by using a high-power laser diode to illuminate a target. The phase shift of the reflected light from the target relative to the AM carrier phase of the transmitted light is apparently measured to compute the range to the target. The gain of the image intensifier within the receiver is modulated at the same frequency as the transmitter. The light reaching the detector is typically dependent on the phase of the return signal and its intensity may also be dependent upon the reflectivity of the target. To normalize reflectivity variations the intensity of the return beam may be sampled twice, one with the receiver modulation gain disabled and once with the modulation on. Thus, the range associated with each pixel is essentially measured simultaneously across the entire scene. This is a relatively short range sensor (46-300 m) and is typically only suitable for inspection purposes. A complete system would typically require the addition of another sensor such as a radar system.

The LDRI is described in, for instance, U.S. Pat. No. 6,677,941 issued to Lin on Jan. 13, 2004 entitled "Three-dimensional relative positioning and tracking using LDRI", the contents of which are hereby incorporated by reference.

The Rendezvous Radar (RVR) for Engineering Test Satellite seven (ETS-VII), launched by the National Space Development Agency of Japan (NASDA) on Nov. 28, 1997 to conduct the space robot technology experiments, is, apparently, an optical navigation sensor which will be used for distances from about 2 m to about 600 m. The RVR emits a 810 nm laser pulse and measures the reflected light from a cubed corner reflector. This is an extremely short range sensor and requires the target to be equipped with cubed corner reflectors, a major disadvantage.

Optech and MD Robotics have developed a Rendezvous Laser Vision System (RELAVIS) to address on-orbit servicing requirements. RELAVIS is similar to the commercially produced ILRIS-3D. Preliminary tests apparently demonstrate a maximum range of about 2.5 km with range accuracy of about 1 cm for the entire range and positional accuracy of about 2 cm. This sensor typically does not require retroreflectors but because of its short range typically must be supplemented by other typically expensive sensors such as radar.

Orbital Sciences has built the Advanced Video Guidance Sensor for use on the NASA DART mission. The sensor is based on the Video Guidance Sensor (VGS) and Advanced Video Guidance Sensor (AVGS) developed by NASA/MSFC for use in space rendezvous and docking. The AVGS fires lasers of two wavelengths, 800 nm and 850 nm at retroreflective targets on the chase vehicle. The retro-reflective targets are shielded with an optical filter that allows only the 850 nm wavelength laser to be reflected. Thus subtraction of the 800 nm image from the 850 nm image highlights the illuminated targets in all lighting conditions. AVGS software generates centroids for each of the targets. The geometric arrangement of the targets allows determination of relative position and orientation. The targets do not have to be in any specific pattern, aside from not being coplanar. At long range a set of widely-space targets are used. At shorter range a cluster of targets are used. This permits the use of the sensor at ranges of 100 s of meters yet preserves precision at closer ranges. The accuracy ranges from 10 mm along the perpendicular and 0.75 deg at 5 m range to 3 mm along the perpendicular and 0.3 deg at less than 3 m. The AVGS/VGS system uses predefined points on the target. In addition, it employs controlled illumination to improve the detection of the points. This simplifies the video processing considerably at the expense of adding the lasers for illumination and retro-reflectors on the target vehicle. This device has limited range and requires retroreflectors on the target spacecraft. Thus, it requires additional sensing means for long range detection.

U.S. Pat. No. 6,411,871 by Ching-Fang Line dated Jun. 25, 2002, the contents of which are hereby incorporated by reference, appears to describe an autonomous navigation, guidance, and control process for docking and formation flying by utilizing the laser dynamic range imager (LDRI) and other key technologies, including fuzzy logic based guidance and control, optical flow calculation (including cross-correlation, phase-correlation, and image differential), software design and implementation, and verification methods. The autonomous navigation, guidance, and control process includes the steps of providing an expected reference position relative to a target; generating a carrier position and attitude relative to said target by a Range and Intensity Images Provider; producing a relative position and attitude error; and producing control commands from said relative position and attitude error for relative motion dynamics. This sensor can only be used at short range and must be augmented by other long range sensors.

SUMMARY OF THE INVENTION

Briefly described, the invention provides a new ladar sensor called a Multimode Optical Sensor (MMOS). The sensor employs both coherent (heterodyne) and noncoherent detection at long range, i.e. ranges for which the target is no more than a pixel in dimension. At short ranges the sensor operates as a camera with or without laser illumination of the target.

The ladar sensor of this invention has significant advantages over the current art. One exemplary advantage is that it may be used to track target spacecraft at a wide variety of ranges from fractions of a meter to hundreds of kilometers. Thus only one sensor may be needed for rendezvous and docking operations. Besides not typically requiring another sensor as almost all prior art systems require, the present invention may, therefore, reduce the cost of integrating and testing a spacecraft since adding each new device to a spacecraft typically incurs considerable expense. Another exemplary advantage over many of the devices is that it, typically, does not require the addition of retroreflectors to the target spacecraft. This may mean that it can be used with any target spacecraft, including those already flying.

These and other features of the invention will be more fully understood by references to the following drawings.

DETAILED DESCRIPTION

Figure 1:
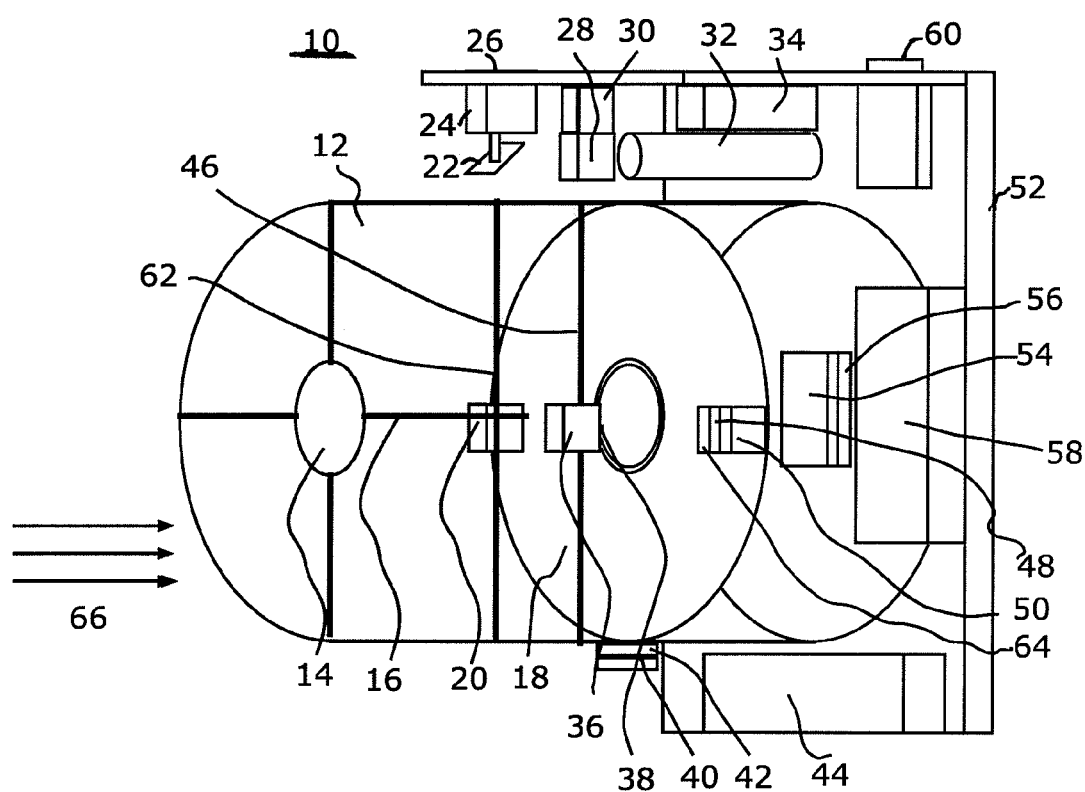
FIG. 1 shows a schematic of a sensor of this invention.

The present invention relates to devices and methods for detecting spacecraft that employ coherent (heterodyne) and noncoherent detection at long range, i.e. ranges for which the target is no more than a pixel in dimension.

A preferred embodiment of the invention will now be described in detail by reference to the accompanying drawings in which, as far as possible, like elements are designated by like numbers.

Although every reasonable attempt is made in the accompanying drawings to represent the various elements of the embodiments in relative scale, it is not always possible to do so with the limitations of two-dimensional paper. Accordingly, in order to properly represent the relationships of various features among each other in the depicted embodiments and to properly demonstrate the invention in a reasonably simplified fashion, it is necessary at times to deviate from absolute scale in the attached drawings. However, one of ordinary skill in the art would fully appreciate and acknowledge any such scale deviations as not limiting the enablement of the disclosed embodiments.

During the course of this description like numbers will be used to identify like elements according to the different views which illustrate the invention.

A preferred embodiment of the invention, a multi-mode optical sensor (MMOS) 10, is shown in FIG. 1.

The multi-mode optical sensor 10 is a novel laser radar (ladar) that employs both coherent (heterodyne) and noncoherent detection at long range, i.e. ranges for which the target is no more than a pixel in dimension. Coherent detection provides much higher velocity resolution while the noncoherent detection can provide better detectability. The multi-mode optical sensor 10 is designed, but not constrained, to be used for measuring relative position, velocity, attitude and attitude rate of a satellite. The multi-mode optical sensor 10 includes a laser 32, that is capable of emitting coherent electromagnetic radiation at a suitable wavelength and power. The multi-mode optical sensor 10 further includes a coherent detector 42 and an energy detector 48. The multi-mode optical sensor 10 may also include a telescope that has a primary mirror 18 and a secondary mirror 14. The multi-mode optical sensor 10 may also include a laser primary beamsplitter 28 that is situated, and functions, to direct a portion of the coherent electromagnetic radiation emitted by the laser 32 toward the coherent detector 42. The laser primary beamsplitter 28 is also situated, and functions, to direct a portion of the coherent electromagnetic radiation emitted by the laser 32 toward the secondary mirror 14 of the telescope. In a preferred embodiment a laser scan mirror 22 and a further laser beamsplitter 20 are used to relay the coherent electromagnetic radiation to the secondary mirror 14.

The multi-mode optical sensor 10 may further include a primary beamsplitter 36 situated, and functioning, to direct a portion of the ambient illumination 66 collected by the primary mirror 18 and relayed via secondary mirror 14 to the primary beamsplitter 36 to the coherent detector 42. The primary beamsplitter 36 may also be situated, and function, to direct a second portion of the collected light to the energy detector 48.

FIG. 1 shows that the telescope housing 12 may extend from the telescope aperture to a baseplate 52. The secondary mirror 144 typically directs light from the primary mirror to the focal point and through the primary beamsplitter 36, laser beamsplitter 20 and a CCD Laser Filter 38.

The secondary mirror supports 16 connect the secondary mirror 14 to the telescope housing 12. The primary mirror 18 collects light or reflects the laser light from the laser 32.

The primary mirror 18 and the secondary mirror 14 may, for instance, be arranged to be one of a Nasmyth configuration, a Cassegrain configuration, a Coude configuration or any other suitable two mirror telescope configuration.

The laser beamsplitter 20 splits the beam into two beams. One beam goes to the laser primary beamsplitter 28 and may be reflected to the secondary mirror 14 and outward through the primary mirror 18. The second beam goes to the coherent detector 42 and is mixed with the incoming radiation.

The laser scan mirror 22 may be used when the sensor is in close range scanning mode and is used to illuminate the target with consistent illumination in all lighting conditions.

The laser two-axis scan mirror drive 24 may provide two axes of scanning.

The electronics housing 26 houses all of the supporting electronics. All electronics have thermally conductive paths to the housing which then conducts heat to an external heat sink.

The laser primary beamsplitter 28 splits the beam into an outgoing beam for illuminating the target and a beam to mix with incoming radiation for coherent detection.

The laser primary beamsplitter support 30 may be attached to the telescope housing 12.

The laser 32 is used both for short and long range illumination of the target. When in long range mode, the system employs pulse compression (linear FM) to get good simultaneous range and velocity accuracy. The laser may also mixed with incoming radiation to get coherent detection. The laser illumination may be used in four modes.

1. Long range coherent—Incoming and outgoing laser pulses are mixed and the beat frequency used to determine range and range rate 2. Long range noncoherent—Incoming laser pulse energy is measured 3. Short range scanned coherent—Incoming and outgoing laser scans are mixed and the beat frequency used to determine range and range rate 4. Short range scanned noncoherent—Laser scans target to get intensity, range and range rate map The laser power supply 34 takes the power from the power supply 44 and conditions it for use with the laser.

The primary beamsplitter 36 may split the incoming radiation among the three detectors.

The CCD chip laser filter 38 may filter out the ambient light when the laser is in use.

The coherent detector electronics 40 may process the signal from the coherent detector 42 prior to sending the signal to the signal processor 58. The coherent detector 42 may mix the laser and external light.

The power supply 44 may be attached to an external power source and produces the voltages needed by all of the devices.

The primary beamsplitter support 46 may be attached to the telescope housing 12.

The energy detector 48 may, for instance, be a semiconductor device selected to be sensitive to the laser wavelengths.

The energy detector electronics 50 may condition the signal from the energy detector prior to sending the output to the signal processor 58.

The baseplate 52 is connected to the electronics housing 26 and provides structural support and a thermal path for all of the devices in the sensor.

The CCD chip 54 may be a two dimensional array of CCD elements that measures optical energy reflected from the target. The radiation may be from the laser 32 or ambient light.

The CCD electronics 56 may read out the charge from the CCD chip 54 and send it one frame at a time to the signal processor 58.

The CCD chip 54 may, for instance, be a Charged Coupled Device, a Charge Injection Device or a Complementary Metal Oxide Semiconductor chip, or other suitable detection electronics.

The signal processor 58 may collect signals from the CCD 54, the coherent detector 42 and the energy detector 48. The input/output plug 60 may be the external interface for the sensor.

The laser beamsplitter support 62 may be attached to the telescope housing to support the laser beamsplitter.

The energy detector filter 64 may be a narrowband filter designed to filter out ambient light so that the detector may essentially only sees the laser radiation.

The ambient illumination 66 may also be used by the CCD 54. This may be measured by the CCD 54 to produce an image.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention. Modifications may readily be devised by those ordinarily skilled in the art without departing from the spirit or scope of the present invention.

What is claimed is:

1. An optical sensor for measuring relative position, velocity, attitude and attitude rate of a satellite comprising:

a laser capable of emitting coherent electromagnetic radiation;

a coherent detector for measuring coherent radiation;

an energy detector for measuring coherent and non-coherent radiation;

a telescope having a primary and a secondary mirror; a first beamsplitter situated to direct a first portion of said emitted coherent electromagnetic toward said coherent detector and to direct a second portion of said emitted coherent electromagnetic radiation toward said secondary mirror of said telescope; and a second beamsplitter situated to direct a first portion of light collected by said primary mirror of said telescope and relayed via said secondary mirror to said beamsplitter to said coherent detector and a second portion of said collected light to said energy detector, wherein the optical sensor, having the coherent detector and the energy detector, measures relative position, velocity, attitude and attitude rate of the satellite.

2. The optical sensor of claim 1 wherein said primary mirror and said secondary minor of said telescope are arranged in a Nasmyth configuration.

3. The optical sensor of claim 1 wherein said primary mirror and said secondary minor of said telescope are arranged in a Cassegrain configuration.

4. The optical sensor of claim 1 wherein said primary mirror and said secondary minor of said telescope are arranged in a Coude configuration.

5. The optical sensor of claim 1 further including a two dimensional array of charge-coupled device (CCD) elements.

6. The optical sensor of claim 5 wherein the two dimensional array of CCD elements is a charge injection device.

7. The optical sensor of claim 5 wherein the two dimensional array of CCD elements is a complementary metal oxide semiconductor chip.

8. The optical sensor of claim 5 further comprising a two dimensional scanning minor.

\* \* \* \* \*